E. G. PARKHURST.
Friction-Pulleys.
No. 150,707.
2 Sheets--Sheet 1.
Patented May 12, 1874.
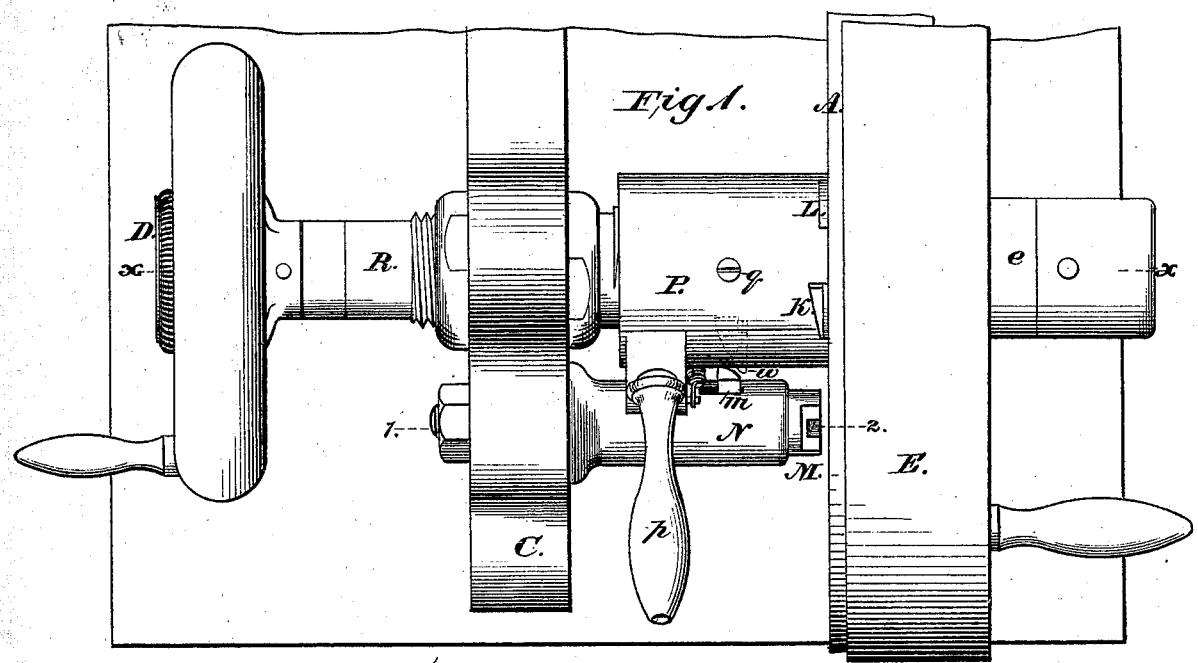
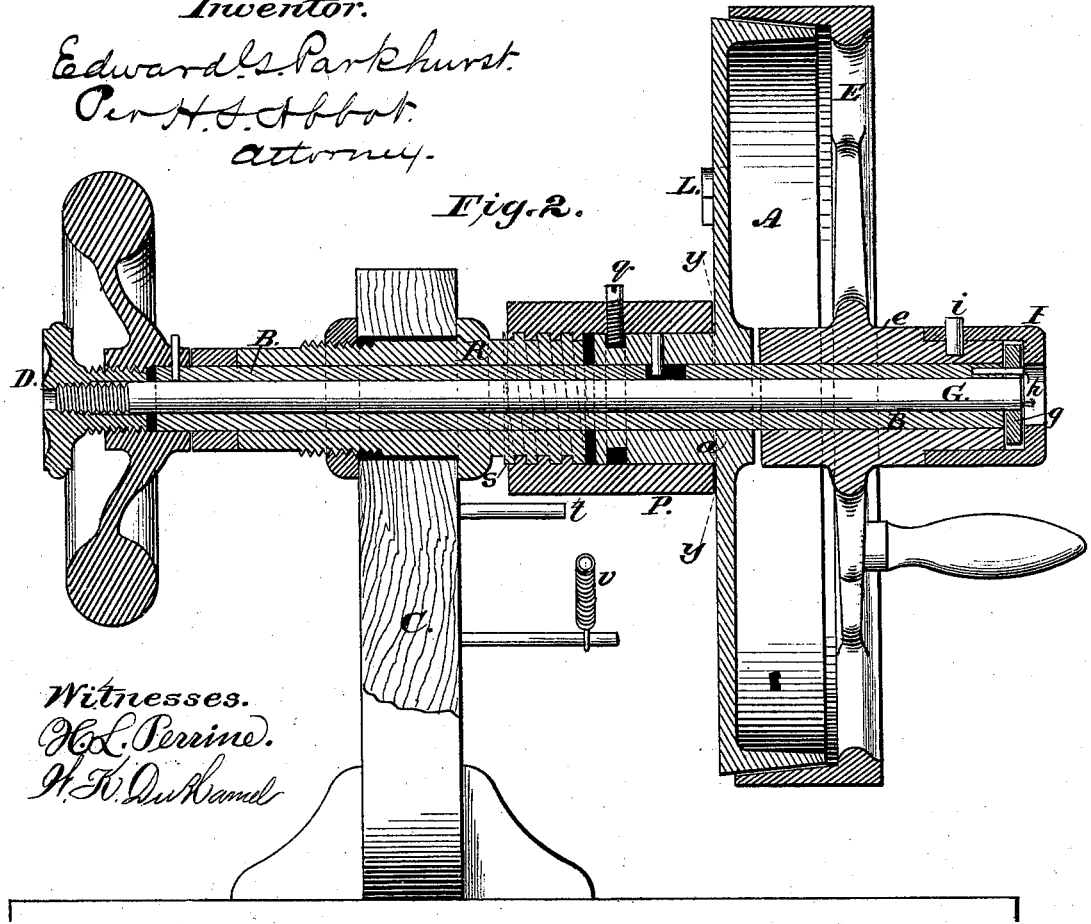
Inventor.
Edward G. Parkhurst.
Per H. S. Abbot.
Attorney.
Witnesses.
H. L. Perrine.
H. K. Durham.

2 Sheets--Sheet 2.

E. G. PARKHURST.
Friction-Pulleys.

No. 150,707. Patented May 12, 1874.

Witnesses:
H. L. Perrine.
Edwin J. McLain.

Inventor.
Edward G. Parkhurst
Per H. S. Abbot.
Attorney.

UNITED STATES PATENT OFFICE.

EDWARD G. PARKHURST, OF HARTFORD, ASSIGNOR TO HENRY G. THOMPSON, OF MILFORD, CONNECTICUT.

IMPROVEMENT IN FRICTION-PULLEYS.

Specification forming part of Letters Patent No. 150,707, dated May 12, 1874; application filed November 15, 1873.

*To all whom it may concern:*

Be it known that I, EDWARD G. PARKHURST, of Hartford, county of Hartford and State of Connecticut, have invented certain new and useful Improvements in Friction-Pulleys, of which the following is a specification:

My invention relates to certain improvements in friction-pulleys, adapted to be applied to machinery in which it is desired to stop the motion at every revolution of the shaft; and the invention consists in a fast pulley attached to a hollow shaft, and a loose pulley attached to a solid shaft passing through said hollow shaft, and connected thereto at one end by means of a nut, formed with an internal or female right-hand screw-thread and an external or male left-hand thread. The invention consists, further, in a spring-bolt or latch attached to the standard or hanger, acting in connection with an inclined and an abrupt projection on the fast pulley, for the purpose of stopping the motion thereof at every revolution of the same. The invention consists, further, in a cam or screw-threaded sleeve working on the shaft of the fast pulley, for the purpose of holding it in contact with the loose pulley while making a revolution, and releasing it instantaneously when the motion is stopped.

Figure 3:
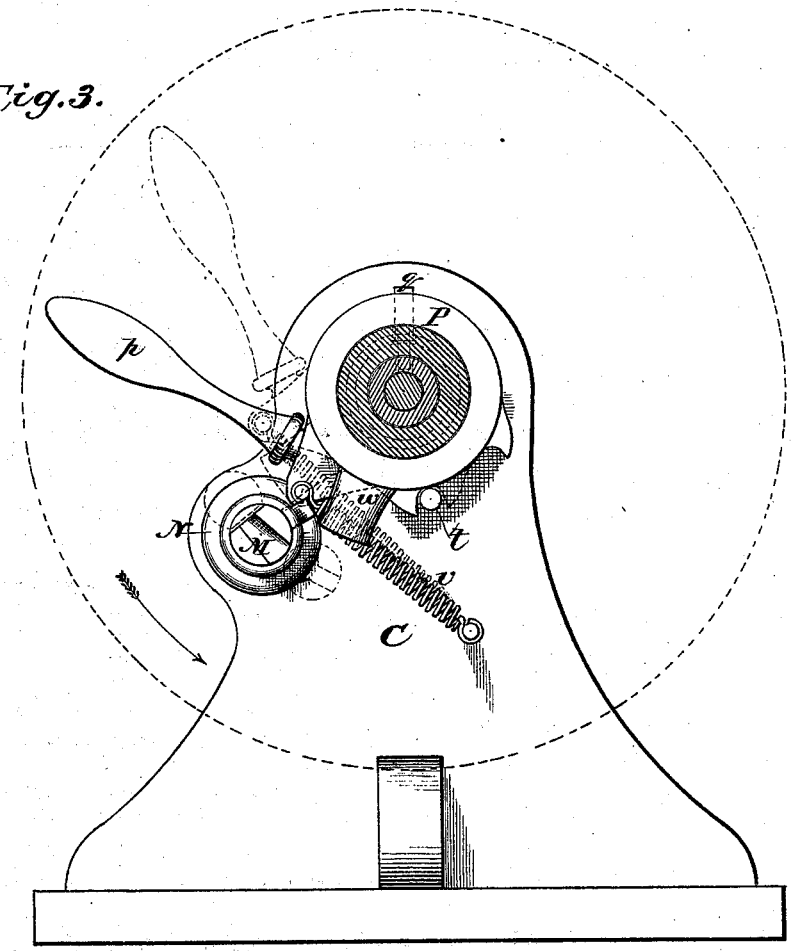
Figure 4:
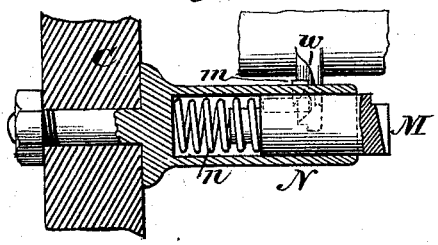
Figure 5:
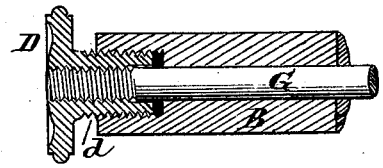

In the accompanying drawings, Figure 1 represents a top view of my invention. Fig. 2 is a central vertical longitudinal section taken in the line $x\,x$ of Fig. 1. Fig. 3 is a transverse section taken in the line $y\,y$ of Fig. 1. Fig. 4 is longitudinal section taken in the line 1 2 of Fig. 1. Fig. 5 is a longitudinal sectional view, showing the nut D attached direct to the hollow shaft B.

The fast pulley A is attached to a hollow shaft, B, journaled in a standard or hanger, C, occupying a suitable position with relation to the machinery to which the invention is applied. The face of this pulley is inclined, as is usual with friction-pulleys. The end of the shaft B nearest the machinery has a female thread cut in it, corresponding with a male left-hand thread on a projecting portion, $d$, of a nut D, which may have its periphery milled or roughened to facilitate its manipulation by hand. The loose pulley E is formed with a hub, $e$, in the outer side of which is a depression for the reception of a head, $g$, formed on the outer end of a solid shaft, G, which passes entirely through the hollow shaft B, and is secured thereto at the outer end by a pin, $h$, passing through the head $g$ and into the end of the shaft B, and at the inner end by a male thread engaging with the female right-hand thread on the nut D. The outer end of the hub $e$ has a cap, I, secured thereon by a pin, $i$, which cap prevents longitudinal displacement of the solid shaft G. The fast pulley A is secured to the shaft B so as to revolve with it, but the loose pulley E revolves independently, except when held in contact with the fast pulley. On the inner side of the fast pulley is a stud or projection, $k$, the exposed portion of which is in the form of a right-angled triangle, with its hypothenuse on the side toward the machinery. At a short distance from this stud is another stud, L, the sides of which are abrupt and perpendicular to the side of the pulley. These studs are secured to the pulley by shanks inserted in openings therein, and may be riveted down or formed with screw-threads, as may be preferred. A spring-bolt or latch, M, works in a sleeve, N, attached to the standard or hanger C parallel with the pulley-shaft, and between it and the periphery of the pulley, and its outer end projects to such a distance as to nearly touch the side of the pulley, so that, as the pulley revolves, the inclined stud $k$ presses back and passes the end of the bolt, and the abrupt projection or stud L, coming in contact with said bolt, suddenly arrests the pulley A, and stops the motion of its shaft and of the machinery to which it is attached. The bolt M is pressed outward by a spring, $n$, in the bottom of the sleeve N, and its motion is limited by a stud, $m$, projecting from the bolt, and working in a slot in the sleeve. Surrounding the hub $a$ of the pulley A, and a portion of the shaft B, is a collar, P, formed with a handle, $p$, for giving it a reciprocating rotary motion. A pin, $q$, passes through the collar and engages with a groove running around the hub $a$, so that the pulley A is free to revolve independently of the collar, but cannot be entirely detached therefrom without removing the pin. Surrounding a portion of the shaft B, and rigidly attached to the hanger C, so as not to turn, is a sleeve, R, on the outer surface of which is cut a male screw-thread, s, the pitch of which runs in the same direction as the belt which passes over the pulley. This screw-thread s engages with a corresponding female thread on the inside of the collar P, so that when a reciprocating rotary motion is imparted to the collar the pulley A is pressed nearer to or farther from the side of the pulley E. The reciprocating rotary motion of the collar is limited by a pin, t, projecting from the hanger or standard, and engaging with two shoulders on the collar. A spring, v, has a tendency to keep the collar pressed in a direction corresponding with the travel of the belt. A cam, w, projects from the collar, just below the handle p, in such a position as to engage with the stud m which projects from the bolt.

The operation is as follows: The loose pulley E is adjusted, by means of the nut D, to such a degree of contact with the fast pulley A as to just allow it to revolve without carrying the fast pulley with it. The loose pulley being in motion the operator raises the handle p, turning the collar P on the screw-thread s, and pressing the fast pulley tightly against the loose pulley, so that both pulleys will revolve together. This motion of the collar brings the cam w in contact with the stud m, forcing back the bolt until the upward travel of the handle p is arrested by the contact of the lower shoulder with the pin t, at which point the stud m slips into a depression in the cam w and hold the parts in that position. As the pulley A revolves the inclined stud K, which projects somewhat farther than the stud L, strikes the end of the bolt M and forces it back far enough to release the cam w from the stud m, when the spring v draws the collar P down to its former position, releasing the pulley A from its pressure against the pulley E, and allowing the loose pulley E to revolve without it, while, at the same instant, the bolt M flies outward, arresting the pulley A by contact with the stud L, and instantaneously stopping the motion of the shaft B and of the machinery to which it is applied.

When the machine is to be operated by hand the loose pulley is adjusted by means of the nut D, so that the fast pulley may revolve independently of the loose pulley. The machine may then be operated by a crank attached directly to the shaft, or in any other suitable manner.

For convenience of illustration, the drawing represents a hand-crank attached to the end of the shaft B.

Having thus fully described my invention, what I claim as new, and desire to secure by Letters Patent, is—

1. A fast pulley, attached to a hollow shaft, in combination with a loose pulley, attached to a solid shaft, passing through and connected with said hollow shaft, substantially as shown and described.

2. The nut D, formed with the internal and external screw-threads, in combination with the shafts B and G, substantially as shown and described.

3. The spring-bolts M in combination with the studs K and L, substantially as and for the purpose specified.

4. The cam w in combination with the stud m on the bolt M, substantially as and for the purpose shown and described.

5. The collar P, working on the screw-threads s, for holding the pulleys in contact while making a revolution and releasing them when the motion is stopped, substantially as shown and described.

6. The combination of the hub e on the loose pulley E, the cap I, and the solid shaft G, whereby the loose pulley is allowed to revolve independently, except when held in contact with the fast pulley, substantially as shown and described.

In testimony that I claim the foregoing as my invention I hereunto affix my signature.

E. G. PARKHURST.

Witnesses:
   H. G. THOMPSON,
   LOREN P. WALDO.